UNITED STATES PATENT OFFICE.

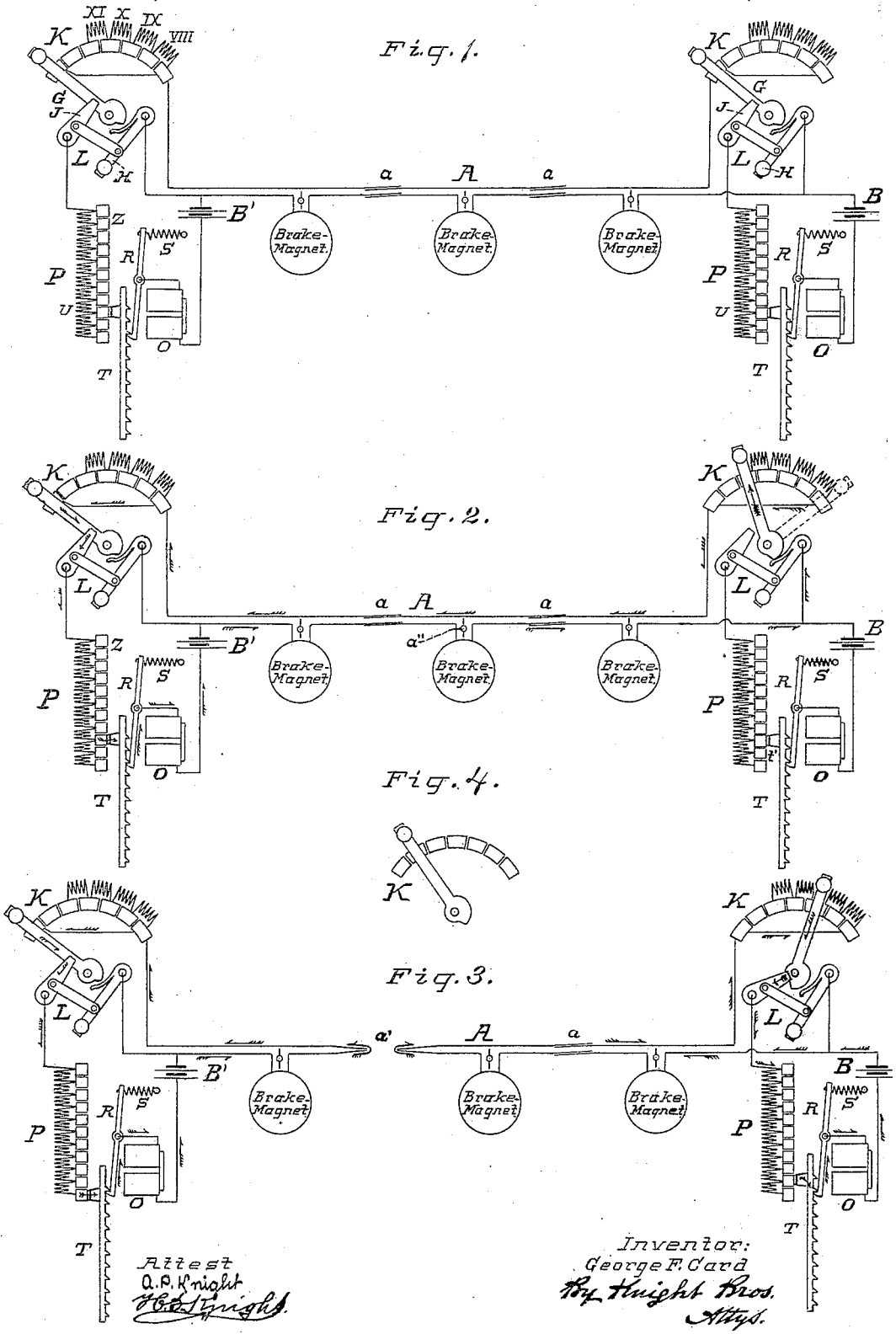

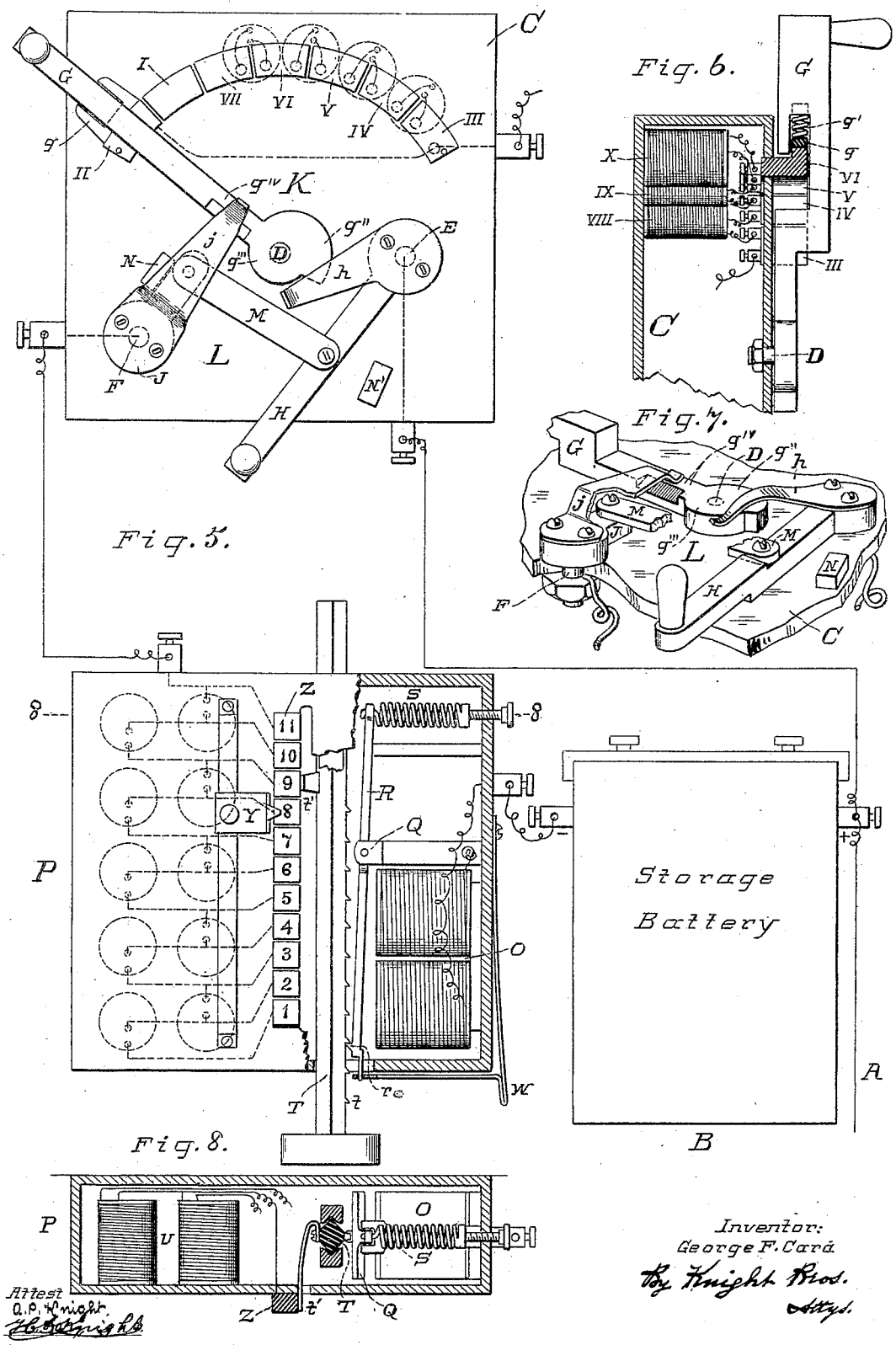

GEORGE F. CARD, OF COVINGTON, KENTUCKY, ASSIGNOR TO HENRY K. LINDSEY, OF CINCINNATI, OHIO.

CIRCUIT SYSTEM FOR ELECTRIC BRAKES.

SPECIFICATION forming part of Letters Patent No. 357,760, dated February 15, 1887.

Application filed July 6, 1886. Serial No. 207,247. (No model.)

*To all whom it may concern:*

Be it known that I, GEORGE F. CARD, of Covington, Kenton county, Kentucky, have invented a new and useful Circuit System for Electric Brakes, of which the following is a specification.

The present is one of several cognate inventions described in specifications of patents granted to or applied for by me in which electro-magnetic agencies are employed to bring into activity one or more sets of car-brakes. My said inventions belong to the class of such devices in which a series of electro-magnets in a metallic circuit coterminous with the train (or so much of it as it may be desired to include in the brake-circuit) and under control of an officer thereof, is employed to liberate for action the system of brake-chain windlasses commonly used to utilize the momentum of the train itself to retard or to stop it.

My present system comprises a normally-closed metallic circuit whose couplings between the several component vehicles of the train are such as, when joined, to present insulated conduits for the outgoing and returning currents, and such as, when separated, to automatically complete the circuit at the point of rupture on each separated portion. Said circuit further includes two distant storage-batteries of equal but oppositely-directed electro-motive force, causing a condition of electrical equilibrium and consequent inaction in the normal condition of the circuit. My said circuit includes on each vehicle composing the train a customary or any suitable electro-magnetic apparatus adapted to dominate the brake mechanism proper of each individual vehicle. Furthermore, in my said system each battery is accompanied by a current-regulating apparatus, (which includes a duplex switch, a regulator-arm, one or more rheostats, and a cut-out,) whose construction is such as to enable discretionary brake action of an unbroken train, and such also as to cause the brakes on each portion of an accidentally-separated train to be automatically set, and yet to be capable of subsequent regulation or withdrawal by a train-man on such separated portion.

In the most complete form of my invention a self-acting rheostat operates to interpose resistances in the circuit, and to thus automatically eliminate any current in excess of what may be required for the number of brakes for the time being included in the circuit, whether on an entire train or on separated portions subjected to the automatic brake action spoken of.

In the accompanying drawings, Figure 1 is a diagrammatic representation of my circuit system in its normal condition—that is to say, closed, but inactive—being charged with two electro-motive forces in equilibrium. Fig. 2 represents the same system with current started for moderate brake action, this condition having been brought about by a displacement of the engineer's regulator-arm, which, while sufficient to have cut out the neighboring battery and automatic rheostat, has been so slight as to leave all the discretionary resistances in circuit. Fig. 3 is a like diagram, designed to represent the conditions which take place on the respective portions of a separated train. The circuit is here shown automatically closed at the ruptured ends of each portion, so as to permit flow of battery-current and consequent brake action on each portion. The figure shows that subsequent to such separation the regulator-arm of the right-hand portion has been so shifted by the engine-man as to throw several resistances in circuit, and to thus moderate the brake action. For simplicity of illustration the above diagrams represent a train of only three vehicles, including the locomotive. In each diagram the gravitating racks of the automatic rheostats are shown dropped to a position which introduces resistances in inverse ratio to the number of cars included in the circuit. Fig 4 shows the regulator-arm in juxtaposition with the inoperative contact-plate. Fig 5 is a partly-sectioned elevation of one of the two current-regulating apparatus, (of identical construction.) Fig. 6 is a vertical section of my current-regulating apparatus at its upper part, the regulator-arm being shown in position for brake action. Fig. 7 represents parts of my duplex switch in perspective. Fig. 8 is a section on the line 8 8 of Fig. 5.

A represents a normally-closed metallic circuit, which includes at remote portions of it two storage-batteries, B B', of identical species and number of elements and of equal electro-motive force. These batteries are so placed in the circuit as in its normal condition (see Figs. 1, 5, and 7,) to put their electro-motive forces in opposition, with consequent electrical equilibrium and inaction. The circuit-wires are connected up from car to car by line-couplings, such as, when joined, afford insulated conduits or conductors for the outgoing and the returning currents, respectively, the construction of said couplings being such that separation causes automatic completion of circuit at the point of rupture on each separated portion. The couplings may have any construction that will secure discharge of the above-stated functions—such as, for example, is substantially shown in my application for patent numbered 186,737. The different positions of the couplings are indicated at $a\, a'$, in which $a$ indicates joined couplings, and $a'$ a separated coupling. The said circuit, on either its outgoing or its return line, communicates with a series of electro-magnets, of which one is placed on each vehicle and dominates its brake-setting mechanism.

The magnets and brake-setting mechanism may have any construction that will secure discharge of their appropriate functions—such as, for example, substantially shown in my application for patent numbered 186,737, or that numbered 207,246. The circles marked "brake-magnet" are intended to indicate the positions of such magnets in the circuit.

My electro-magnetic system is applicable to brake-setting mechanism having the customary means of applying the brakes by hand, and which means may be retained unchanged on trains provided with my invention.

Associated with each battery is a group of devices constituting my current-regulator, which enable the potential energy of one or other battery to be liberated for brake action. These regulators being of identical construction, description of one will apply to both. My said current-regulators each comprises a board or stand, C, having pivots D E F for three arms, G H J, of which arm G is my "regulator-arm" of the combined switch, cut-out, and rheostat K, and of which H and J constitute the arms and M the non-conducting link of my "duplex switch" L. Stops N N' determine the distance to which the duplex switch can be vibrated. One extreme of such vibrations is seen in Figs. 1, 2, 5, and 7, and at the left of Fig. 3. The other extreme is seen at the right hand of said Fig. 3.

Secured to the stand C, in an arc concentric with the pivot D, is a group of insulated contact-plates, of which plate I (being that next to the left-end plate of the group) is inert, having no electrical communication with either of the other plates nor with any other member of the circuit.

Plates II and III (occupying the extremities of the arc) have direct electrical communication with each other and with the line, and consecutive electrical communication through resistance-coils VIII, IX, X, and XI with the remaining contact-plates of the group, to-wit: plates IV, V, VI, and VII. For simplicity of illustration seven contact-plates only are here shown. The number of such contact-plates in actual use will be such as to secure the desired graduation of brake action and for all possible cases. The regulator-arm G has a slide, $g$, whose contact with the plates is maintained by means of a spring, $g^{\text{I}}$.

The office of the plate I is simply to enable easy passage of slide $g$ from one to the other of the plates on each side of it, and, except for this object, the plate I might be omitted and its place occupied by a space of sufficient width to completely break circuit whenever the regulator-arm occupies the position shown in Fig. 4.

Portions $g^{\text{II}}\, g^{\text{III}}$ of arm G operate as rests or places of alternative impact for contact-springs $h$ and $j$, that project from the respective arms H and J. Said arm G has also a narrow resting-place, $g^{\text{iv}}$, for impact of the said spring $j$ when the parts occupy the relative position shown in Figs. 1, 5, and 7 and on the left-hand portions of Figs. 2 and 3. The regulator-arm G serves to complete the circuit through one or more of the group of contact-plates with springs $h$ and $j$, alternatively. The pivot E has electrical communication with the positive terminal of the neighboring storage-battery. The negative terminal of said battery communicates with pivot F.

To enable self-adaptation of the device to trains of diverse resistances, communication with the said pivot F is made through an automatic rheostat, P, of the following construction: The wire from said negative terminal is convoluted to form helices of an electro-magnet, O, which communicates with fulcrum Q of retractile armature R, which armature is normally held aloof from the magnet-poles by an adjustable spring, S.

The armature R has a ratchet-tooth, $r$, that normally engages with one of a series of like teeth, $t$, of a gravitating rack, T, which is by this means both upheld by and placed in electrical communication with said armature.

Extending laterally from the rack T is a contact spring or slide, $t'$, which places said rack in electrical communication with one or other of a series of insulated contact-plates, Z, that communicate, in the manner indicated by dotted lines in Fig. 5, through a series of interposed resistance-coils, U, the upper right hand one of which and the uppermost contact-plate have direct electrical communication with the stud F of arm J.

The yielding character of the impact of the rack T with the armature R and the ratchet-form of their teeth make it possible to restore the rack at any moment to its elevated normal position while in contact with the armature by the simple act of lifting the rack.

A handle, W, by which the armature R may be disengaged from the rack T, enables the person in charge to assure himself of the working condition of the rack by momentary withdrawal of the armature, so as to liberate the rack to drop in its guides, and also enables the elevation of the rack to normal position without rubbing of the ratchet-teeth.

By means of the device P the resistance of the circuit is kept constant automatically whatever the number of cars carrying brake-magnets added to the train.

Referring to Fig. 2, in which the brake-magnets of the locomotive and two cars are represented, it will be seen that the rack T is placed against the third contact-plate from the bottom, thus cutting out two of the resistance-coils. If one of the cars be removed from the train and the resistance of the circuit thus diminished by the abstraction of one set of brake-magnets, the increased current passing around the helices O will overbalance the action of the spring S on armature R, and, oscillating said armature, will allow the rack T to drop one tooth, bringing its contact-spring $t'$ into engagement with a lower contact-plate, and consequently throwing another resistance-coil into the circuit. Should, however, one or a number of cars be added to the train, the operator has simply to restore the rack T to its uppermost or normal position and let go of it, when the rack will drop to its proper new position, as much higher than its former one as corresponds to the increased resistance. In other words, for a shortened train the device P is absolutely automatic, requiring no attention whatever, while for a lengthened train it is equally automatic after performance of the simple act of re-elevation of rack T to its normal position. Furthermore, should the operator be in doubt he can at any instant insure proper self-adjustment and at the same time inform himself of the present condition of the train by momentary elevation of the rack, as above stated.

A pointer, Y, capable of being shifted up or down, so as to stand opposite one of the series of contact-plates Z, may be placed by the operator opposite the plate whose number corresponds to that of the cars constituting the train when made up. If, now, the rack T be elevated to normal position just before a brake action, passage of current through the rheostat P will drop the rack to a point at which its indicator-slide $t'$ will stand opposite that contact-plate whose numeral corresponds with the present number of vehicles in the brake-circuit. If no change has been made in the train the slide $t'$ will stop immediately opposite the pointer Y. If cars have been added since the making up of the train, the slide $t'$ will stop above, and if cars have been abstracted from the train or cut out of circuit the said slide will stop below said pointer. The device P consequently serves to automatically regulate the current of the electro-magnetic brake-setting mechanism to conform with the requirements of the number of brakes that may be at any one moment included in the circuit, and it also discharges the functions of an indicator by which the operator becomes advised of any change in the train.

The various applications of the above-described apparatus will be obvious to a brakeman. For example, in the normal condition indicated in Figs. 1, 5, and 7, in which both regulator-arms occupy their extreme left position, the electrical forces being in equilibrium, and consequently inert, no brake action occurs. The entire series of brakes may, however, be simultaneously applied with any desired promptness and force by an operator either on the locomotive or on the rearmost car. Fig. 2 shows a condition of the apparatus which secures such brake action. In this figure the regulator-arm, which is under control of the engine-man, is seen to have been shifted to the contact-plate VII, relieving said arm from contact with the spring $j$, and thus cutting out the nearer battery, B. The same shift brings the part $g^{II}$ of said arm in contact with the spring projection $h$ of the arm H. This impact of spring $h$ and arm H puts the distant battery, B', again in a closed circuit, but a circuit which is free from the antagonism of the now eliminated battery B. This of course operates to liberate for action the current of battery B', which accordingly traverses the circuit in the manner indicated by arrows in said Fig. 2 and energizes the brake-magnets. When the operating auxiliary arm occupies the position shown by strong lines at the right-hand portion of Fig. 2, the entire series of discretionary resistances VII, IX, X, and XI are in circuit. Such position of the regulator-arm does little more than take up the slack of the brake-chain and put the apparatus in condition for prompt and effective action. Should, now, the engine-man desire to simply slow down the train, he cuts out resistance-coil XI by shift of the regulator-arm to contact-plate VI. Should he desire to bring the train slowly to a standstill, he shifts the arm farther to the right—for example, to contact-plate V. If the emergency be such as to demand a halt of the train with the utmost promptitude, the engine-man shifts the arm to the extreme right, so as to cut out all the optional resistances. This extreme position of the arm is shown by dotted lines on right-hand portion of Fig. 2.

Having described the operations of my device on an unbroken train, I now proceed to explain its actions on the two parts of a train which have become separated from any cause.

Should the train become accidentally separated, the distinct and unopposed circuit of each battery is closed at the points of rupture, as represented at $a'$, Fig. 3, and automatically initiates brake action on its portion of the divided train. At the instant of separation the regulator-arm on each separated portion must occupy, of course, the extreme left position for consequent prompt and effective brake action. This action may, after separation, be modified by shifting the duplex switch L to its extreme right position, and the regulator-arm G to a position that will introduce one or more resistances into the circuit—for example, to contact-plate V—so as to include resistances VIII and IX, as shown on the right-hand portion of Fig. 3. Movement of the regulator-arm leftward—as, for example, to plate VI or to plate VII—operates to still further reduce brake action. Finally, a shift of the said arm to the inert or "dummy" plate I, as shown in Fig. 4, instantly ruptures the circuit and releases the brakes on that portion of the separated train. In actual use, however, it of course often happens that a train is purposely separated, and when this occurs automatic brake action is sometimes not desired. In such cases the regulator-arm should be shifted to the inert plate I before uncoupling of the train.

The fact that there is comparatively abundance of room on the caboose, and the further fact that application of brakes on my system will generally be by the engine man by cutting out his own battery so as to utilize that in the caboose, it will usually be desirable that the capacity of the caboose-battery be considerably the greater of the two, although the desired equality of electro-motive force will make it necessary that both batteries be of same species and have the same number of cells in tension. Such greater capacity will fit the caboose-battery for prolonged efficiency, notwithstanding its comparatively frequent use.

Should the caboose-battery give out, the engine-man has merely to notify the train-man of the fact by any customary signal and to restore the locomotive-battery to circuit. If, then, the signal is given to apply brakes, that duty will devolve on the train-man, who will proceed accordingly to bring the locomotive-battery into play by removal from the circuit of the opposing force of that on the caboose.

A train provided with my circuit-system may be made to include one or more "foreign" cars. For example, the regulator-arm of the controlling mechanism on the locomotive having been placed on the inert contact-plate I, as shown in Fig. 4, the train is then separated, so as to close the circuits at the points of rupture, as represented at $a'$, Fig. 3. Any number of foreign cars may be then introduced at the point $a'$ and be mechanically coupled into the train. Should, now, either the engine-man or the conductor desire application of the brakes, he will so signal, and then each will, having recourse to the manipulations previously described, apply the brakes on his section of the train.

Practical tests with a circuit system as above, show that any discrepancy of electro-motive force in the two batteries tends to self-rectification by current setting in from the battery of higher to that of lower potential, so as to promptly produce the desired equilibrium.

I am aware that the expedient of placing two sources of electricity in opposition in a single closed electro-magnetic circuit is much older than any existing patent—as, for example, in differential galvanometers. Such expedients, therefore, being public property, no claim is here made, broadly, thereto.

I am further aware that it has been proposed to apply two such opposed sources in a closed electro-magnetic brake-circuit; but the arrangements of parts in such devices have, so far as known to me, been only such as to be operative by a reversal of one of the opposed currents, so as to unite both in tension and of course draw electric force from both sources simultaneously. My system of electro-magnetic circuit, on the contrary, although employing the familiar expedient of two electrical sources which are normally in opposition, is radically different from brake-systems, such as above referred to, in that its construction and arrangement are such that under no circumstances can both batteries be used simultaneously, either in series or otherwise, and that either can be made available only by exclusion, for the time being, of the other, whose force is thus held in abeyance for independent use, as hereinbefore explained.

I claim as new and of my invention—

1. The combination, with a normally-closed electro-magnetic circuit having electrical communication with the brake-setting apparatus of a railway-train, of two sources of electricity of equal electro-motive force, located at respectively remote ends of said train, the said sources being normally connected in opposition, and being adapted to be alternatively brought into action in the several modes and for the several purposes set forth.

2. The combination of the following elements, to wit: a normally-closed electric circuit upon and extending throughout the whole or selected portion of a railway-train, electro-magnetic brake mechanisms on cars of such train, and two symmetrically-arranged groups of storage-batteries connected in opposition, and of which each battery is accompanied by and connected with current-regulating mechanism, and with means in each group for bringing the other into action by exclusion of its own battery from circuit, substantially as and for the purposes herein explained.

3. In a circuit system for railway-brakes, the combination of the following elements: a normally-closed metallic circuit coterminous with the train, and comprising two remote storage-batteries of equal but oppositely directed electro-motive force, means on each vehicle of electrical communication with the brake-magnets, the duplex switch L, and the combined switch, rheostat, and cut-out K, substantially as and for the purposes set forth.

4. In a circuit system for railway-brakes, the combination of the following elements: a normally-closed metallic circuit coterminous with the train, and which comprises two storage-batteries at the remote ends of the train of equal but oppositely-directed electro-motive force, means on each vehicle of electrical communication with the brake-magnets, the duplex switch L, the combined switch and rheostat K, and the inert contact-plate or cut-out I, substantially as and for the purposes set forth.

5. In a circuit system for railway-brakes, the combination of the following elements: a normally-closed metallic circuit coterminous with the train, and which comprises two storage-batteries (on the locomotive and the rear car respectively) of equal but oppositely-directed electro-motive force, means on each vehicle for electrical communication with the brake-magnets, the duplex switch L, the combined switch, rheostat, and cut-out K, and an automatic rheostat, P, as and for the purposes set forth.

6. In a circuit system for railway-brakes, the combination, with the regulator-arm G, of a concentric series of contact-plates, the two end plates being connected with each other and with the line, a contact-plate next to one of the end plates being isolated from said line, and the remaining plates of the series having connection with the series of resistance-coils, substantially as and for the purposes set forth.

7. In a circuit system for railway-brakes, the rheostat and cut-out K, a regulator-arm having spring-contact $g$, and contact-surfaces $g^{II}$, $g^{III}$, and $g^{IV}$, in the described combination with the duplex switch L, consisting of the two mechanically-coupled arms H and J, as and for the purposes set forth.

8. In a circuit system for railway-brakes, the automatic rheostat P, comprising electro-magnet O, conducting-fulcrum Q, retractile and conducting toothed armature R, gravitating and conducting rack T, contact-plates Z, and resistance-coils U, the whole being combined and operating as set forth.

9. The combination, with the resistance-coils P and their contacts, of the gravitating rack T, having the handle W, for discretionary release of the said rack, as and for the purposes explained.

In testimony of which invention I hereunto set my hand.

GEORGE F. CARD.

Attest:
A. P. KNIGHT,
FRANCIS M. BIDDLE.